United States Patent [19]
Rahimi et al.

[11] Patent Number: 5,271,838
[45] Date of Patent: Dec. 21, 1993

[54] FILTER ASSEMBLY WITH FILTER ELEMENTS SEPARATED BY SPACERS

[75] Inventors: Riazuddin S. Rahimi, Homer; Mark W. Johnson, Taylor, both of N.Y.

[73] Assignee: Pall Corporation, Glen Cove, N.Y.

[21] Appl. No.: 759,914

[22] Filed: Sep. 13, 1991

[51] Int. Cl.$^5$ .............................................. B01D 29/39
[52] U.S. Cl. ..................... 210/346; 210/486; 210/487; 210/488; 210/498; 55/484
[58] Field of Search ................. 55/484, 485; 210/346, 210/486, 487, 488, 489, 498

[56] References Cited

U.S. PATENT DOCUMENTS

| | | |
|---|---|---|
| Re. 13,053 | 12/1909 | Paul . |
| 837,845 | 6/1905 | Keifer . |
| 1,146,499 | 7/1915 | Jaszkowiak . |
| 1,927,228 | 9/1933 | Compton . |
| 2,444,147 | 6/1948 | Walton ................................. 210/486 |
| 2,630,228 | 3/1953 | Wright et al. . |
| 2,654,440 | 10/1953 | Robinson . |
| 2,683,029 | 7/1954 | Ricardo . |
| 2,750,047 | 6/1956 | Hasbrouck . |
| 2,798,718 | 7/1957 | Gross . |
| 2,813,632 | 11/1957 | Muller ................................. 210/488 |
| 3,294,241 | 12/1966 | Sicard et al. . |
| 3,398,834 | 8/1968 | Nuttall et al. ...................... 210/486 |
| 3,537,592 | 11/1970 | Ogden . |
| 4,704,207 | 11/1987 | Chu . |
| 4,876,007 | 10/1989 | Naruo et al. ....................... 210/486 |
| 4,902,420 | 2/1990 | Pall et al. . |

FOREIGN PATENT DOCUMENTS

| | | |
|---|---|---|
| 433113 | 3/1939 | Belgium . |
| 0268761 | 6/1988 | European Pat. Off. . |
| 951404 | 3/1964 | United Kingdom . |

Primary Examiner—Robert A. Dawson
Assistant Examiner—W. L. Walker
Attorney, Agent, or Firm—Leydig, Voit & Mayer

[57] ABSTRACT

A filter assembly includes a housing having an inlet and an outlet, at least two filter elements stacked inside the housing, and a spacer positioned between the filter elements. The spacer includes a body having an opening which is larger than the inner diameter of at least one of the filter elements and is no smaller than about one-third of the outer diameter of a filter element. The spacer is free of any structure which extends into the opening.

37 Claims, 6 Drawing Sheets

FILTER ASSEMBLY WITH FILTER ELEMENTS SEPARATED BY SPACERS

TECHNICAL FIELD

The present invention is related to filter assemblies and, in particular, to filter assemblies which include a stack of filter elements separated by spacers.

BACKGROUND OF THE INVENTION

Conventional filter assemblies can include two or more generally disk-shaped filter elements stacked along a central hub or tube. The upper and lower surfaces of each filter element are covered with a porous filter medium, and a drainage structure that communicates with the central tube is positioned between the upper and lower filter media of each filter element. The stack of filter elements, which is arranged with a gap between each pair of adjacent filter elements, is enclosed in a housing.

Fluid is supplied to the housing, typically at high temperature and high pressure. The fluid enters the gaps between adjacent filter elements and then passes through the porous filter media covering each filter element. As the fluid passes through the filter media, undesirable substances such as particulates, aggregates, or gels are removed from the fluid. After passing through the upper and lower filter media of each filter element, the filtered fluid then flows along the drainage structure to the central tube and exits the housing via the tube.

These conventional filter assemblies are useful in a variety of industrial applications, including the filtration of fluids such as molten polymers or monomers. However, because these fluids typically have a relatively high viscosity (i.e., are very thick), a significant pressure drop can develop in the gap between the filter medium surfaces of adjacent filter elements as the fluid flows in the gap and through the media. Slight differences in the gaps between adjacent filter elements and slight differences in fluid flow rates into and within the gap can result in different pressure drops in the gaps on opposite sides of a filter element. This difference in pressure drops from one side of a filter element to the other produces a force which is exerted across the filter element and which can be large enough to cause deformation and even failure of the filter element. Consequently, spacers are frequently used in these conventional filter assemblies. The spacers are positioned in the gaps between pairs of adjacent filter elements and extend inwardly to the hub or central tube. The spacers serve to maintain equal gaps between adjacent filter elements and to prevent deformation of one filter element towards an adjacent filter element should a force develop due to slight spacing differences or slight flow rate differences.

Unfortunately, conventional filter assemblies with spacers suffer from several disadvantages. For example, because the spacers are positioned between adjacent filter elements and next to the hub, the spacers can interfere with the free flow of fluid between the filter elements. This creates stagnant areas and dead spots, which, in turn, reduce the efficiency of the filter assembly. Further, because the spacers are forced against the filter elements by the pressurized fluid and to a lesser extent by the weight of the filter elements, the spacers can compress the filter media and blind (i.e., prevent passage of fluid through) large areas of the filter media. Where the spacers are not permanently attached to the filter elements, every time the filter elements and spacers are removed, cleaned, and reassembled, an additional area of the filter media is rendered blind. This progressively reduces the efficiency of the filter assembly.

Conventional spacers have other disadvantages. For example, some spacers are disposed between filter elements with spacing members that extend radially outwardly almost to the outside diameter of the filter elements from a central ring mounted about the central hub or tube. However, the support provided by these radial members declines with increasing diameter because the distance between them increases. Another conventional spacer comprises a mesh washer with the inside and outside diameters coinciding with the outside diameter of the filter element hub and the outside diameter of the filter element, respectively. In addition to many of the disadvantages previously mentioned, these spacers have surface area which resists the flow of fluid between adjacent filter elements and increases the residence time of the fluid between filter elements.

DISCLOSURE OF THE INVENTION

The present invention provides an improved spacer and a filter assembly which incorporates the improved spacer. In accordance with one aspect of the invention, a spacer may comprise a body which includes an opening. The opening is larger than the inner diameter of a filter element and is no smaller than about one-third of the outer diameter of the filter element. Further, the spacer is free of any structure which extends into the opening.

In accordance with another aspect of the invention, a spacer may comprise a body having an opening which is at least 10% larger than the diameter of the hub. Further, the spacer is free of any structure which extends into the opening.

In accordance with a further aspect of the invention, a spacer may comprise a body and a positioning arrangement which extends outwardly from the body to the outer periphery of a filter element.

In accordance with an additional aspect of the invention, a filter assembly may comprise a housing, at least two filter elements, and a spacer. The housing has an inlet and an outlet. The filter elements are stacked inside the housing and each filter element has an exterior which communicates with the inlet. The stack of filter elements has a central channel which communicates with the outlet. The spacer is positioned between the filter elements and includes a body having an opening. The opening is larger than the inner diameter of at least one of the filter elements and is no smaller than about one-third of the outer diameter of the filter element. Further, the spacer is free of any structure which extends into the opening.

In a preferred embodiment of the invention, the spacer comprises at least one corrugated ring and several fingers which extend outwardly from the ring in order to maintain the ring in position with respect to the filter elements. The fingers are arranged to face the outer periphery of a filter element and may include spring clips. Because the spacer is in the shape of a large, corrugated ring and because the fingers extend outwardly to the periphery of the filter element, the spacer minimally hinders the flow of fluid between adjacent filter elements in the vicinity of the hub, eliminating stagnant areas and dead spots, and yet fully supports the filter elements. The spacer also minimizes contact between the spacer and the filter elements and therefore prevent damage to or excessive blinding of the filter elements.

DESCRIPTION OF EMBODIMENTS

Figure 1:
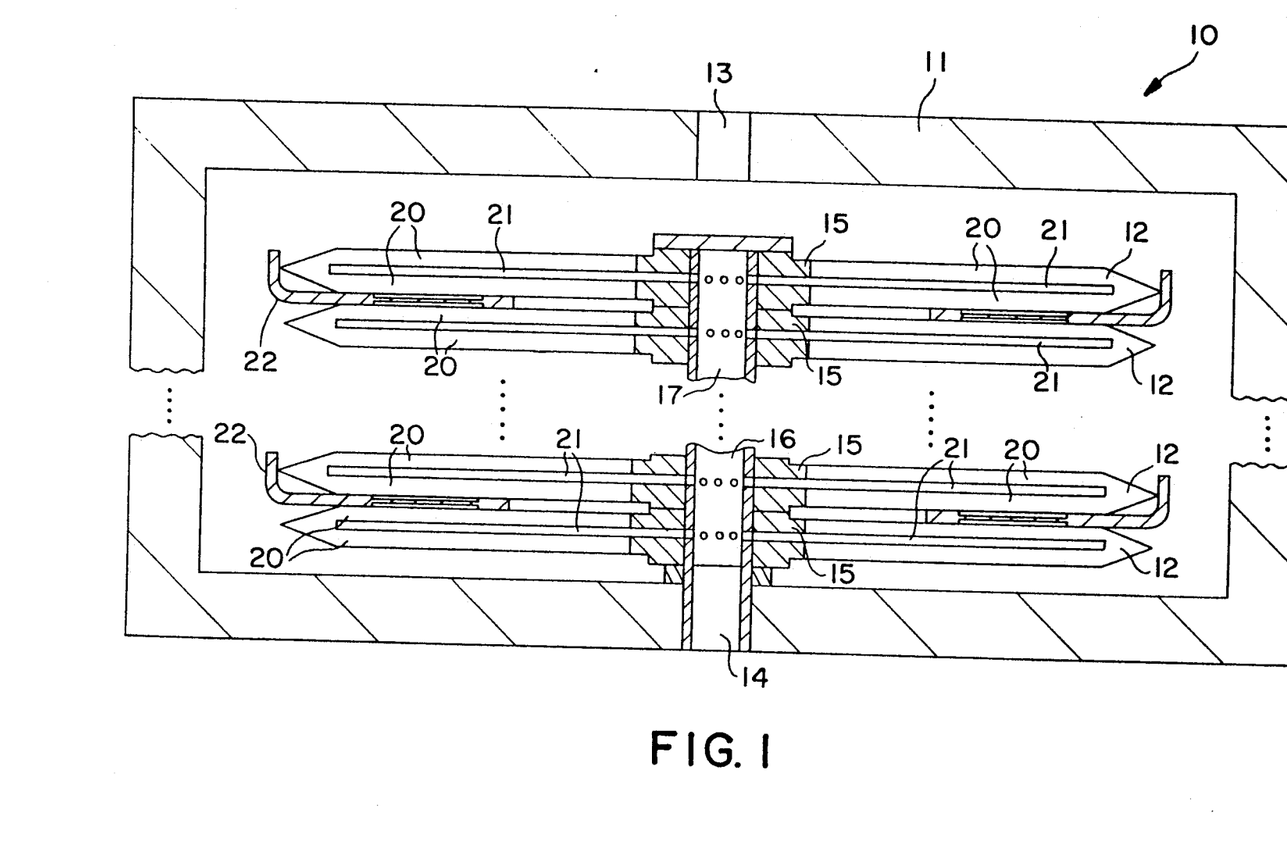
FIG. 1 is an elevation view representing a filter assembly embodying the present invention.

As shown in FIG. 1, a filter assembly 10 embodying the invention generally comprises a housing 11 and two or more filter elements 12 stacked inside the housing 11. The housing 11 includes an inlet 13 and an outlet 14 and defines a fluid flowpath between the inlet 13 and the outlet 14. Each filter element 12 may include a hub 15 that can be fitted around a perforated collection tube 16 which surrounds a central channel 17. The filter element 12 further includes a porous filter 20 mounted about the exterior on both sides of the filter element 12 to remove undesirable substances from the fluid. The exterior of each filter element 12 communicates with the inlet 13 and the central channel 17 communicates with the outlet 14. Thus, fluid flowing into the housing 11 through the inlet 13 flows through the porous filter 20 on both sides of the filter element 12, where the undesirable substances are removed from the fluid. The filtered fluid then passes along one or more passages 21 which extend generally radially through the center of the filter element 12 and the hub 15, empties into the central channel 17 through the perforations in the collection tube 16, and then exits the filter assembly 10 through the outlet 14. Any suitable housing and filter element may be utilized for the filter assembly, including those disclosed in U.S. Pat. No. 4,902,420 and available from Pall Corporation.

In accordance with one aspect of the invention, the filter assembly 10 further comprises a spacer 22 positioned between adjacent filter elements 12. The spacers 22 serve to support the filter elements 12 against any forces which might otherwise deform the filter elements 12 and to maintain the filter elements 12 evenly spaced from one another in a manner which will minimally hinder the flow of fluid between adjacent filter elements 12 and inhibit the formation of stagnant areas or dead spots between the filter elements 12. Further, the spacer 22 supports the filter elements 12 without damaging or excessively blinding the porous filters 20 of the adjacent filter elements 12.

Figure 2:
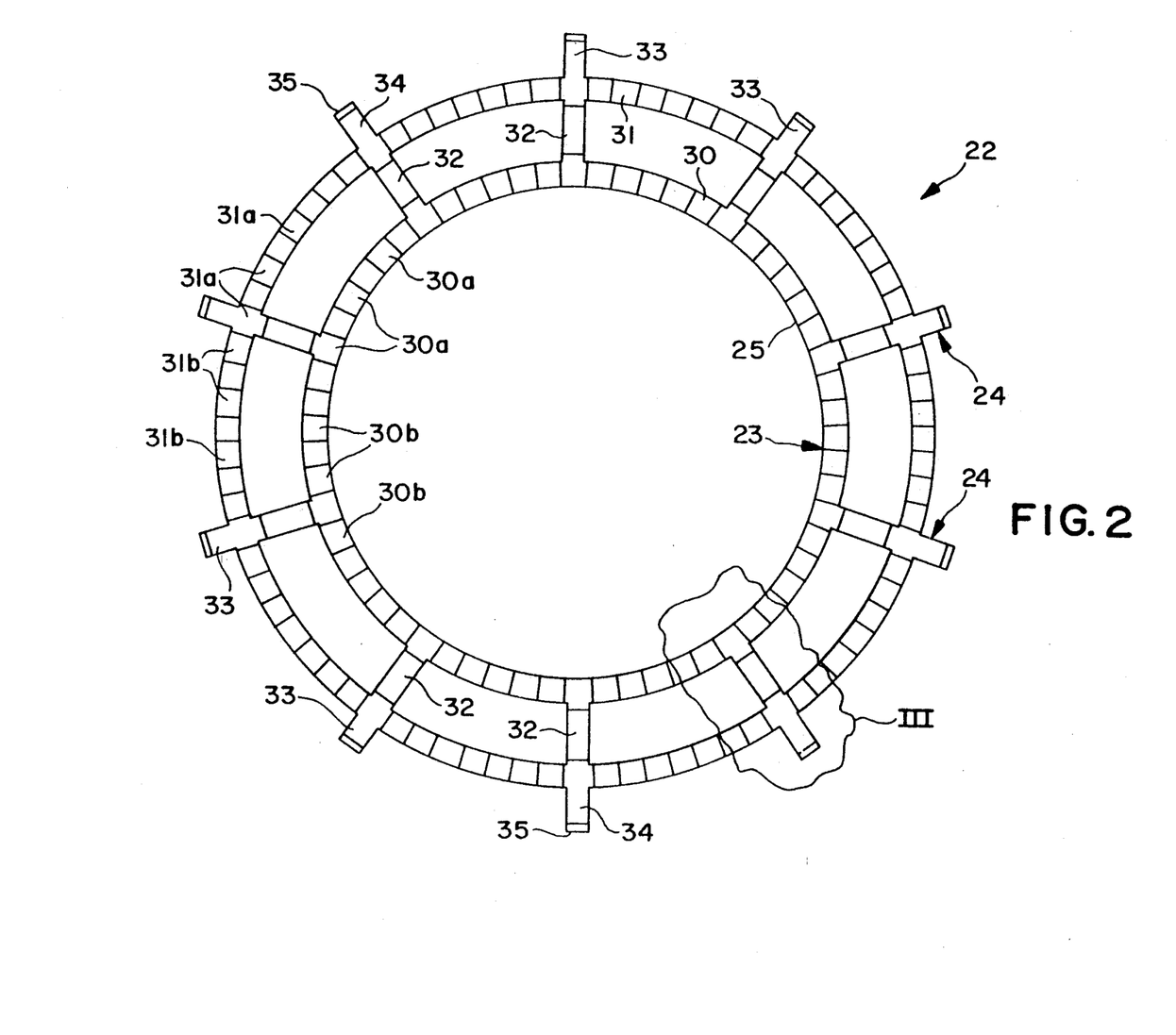
FIG. 2 is a top plan view of a spacer of the filter assembly of FIG. 1.

As shown in FIG. 2, one embodiment of the spacer 22 generally comprises a corrugated body 23 and a positioning arrangement 24 which maintains the corrugated body 23 in place between the adjacent filter elements 12. The corrugated body 23 has an opening 25 through which the collection tube 16 or both the hub 15 and the collection tube 16 extend. Although the opening may have a variety of shapes, the size of the opening 25 is preferably at least about 10% greater than the diameter of the hub 15 so the spacer 22 is spaced from and not in contact with either the hub 15 or the collection tube 16. Further, the size of the opening 25 is preferably larger than the inner diameter and no smaller than about one-third of the outer diameter of the filter element 12.

The corrugated body may be variously configured. It may have a generally circular or triangular shape and comprise a plate with one or more uneven surfaces. Alternatively, the corrugated body may comprise a single corrugated ring or, preferably, a plurality of nested, corrugated rings 30,31 connected by struts 32, as shown in FIG. 2. The opening then is generally circular and the size of the opening corresponds to the inner diameter of the innermost ring. The circular rings of this embodiment of the spacer according to the present invention are superior to the radial outwardly directed rays of conventional spacers. The rings fully support adjacent filter elements along the entire circumference of the ring. In contrast, radial rays can have large distances between them, especially at the outer diameter of the filter elements, where the filter elements are essentially unsupported.

Although the corrugated body may comprise more than two rings, the embodiment illustrated in FIGS. 1-4 has only two rings, i.e., an inner ring 30 and an outer ring 31. Two rings 30,31 fully support the stack of filter elements 12 against the forces generated by the fluid and by gravity. Limiting the number of rings to two significantly reduces the impediments to fluid flow between the adjacent filter elements 12 and also reduces any blinding of the porous filters 20.

In the illustrated embodiment, the rings 30,31 are concentric and are relatively narrow. The outer ring 31 preferably has an outer diameter which is only slightly less than the diameter of the filter elements 12. Therefore, the outer ring 31 provides support at the outer edge of the filter elements where the forces exerted by the fluid and gravity can have their greatest effect. With the outer ring 31 supporting the outer edge of each filter element 12 and the hub 15 supporting the center, the inner diameter of the inner ring 30 may be selected to provide maximum support between the outer edge of the filter element 12 and the hub 15. For example, the inner diameter of the inner ring 30 may be greater than the inner diameter of the filter elements 12 and in the range from about 33% to about 67% or more of the outer diameter of the filter elements 12. Further, the inner diameter of the inner ring 30 is preferably at least about 10% greater than the diameter of the hub 15. Consequently, the inner diameter of the inner ring 30 is large enough to define an opening 25 which provides significant space between the hub 15 and the spacer. Further, the spacer 22 is preferably free of any structure which extends into the opening 25. With the spacer 22 spaced from the hub 15 and collection tube 16, there is no impediment to fluid flow in the vicinity of the hub 15 and the fluid freely flows within the deepest recesses between the adjacent filter elements 12 without any dead spots or stagnant areas.

Each corrugated ring 30,31 of the illustrated embodiment comprises alternating upper pads 30a,31a and lower pads 30b,31b connected by braces 30c,31c. Because the upper pads 30a,31a and lower pads 30b,31b alternate with one another, very little of the surface area of the porous filter 20 is actually contacted by the narrow rings 30,31. Consequently, blinding of the porous filter 20 by the spacer 22 is minimized. In addition, this arrangement of pads 30a,31a,30b,31b and braces 30c,31c provides numerous openings. Consequently, the rings 30,31 present little resistance to flow. The fluid freely flows amongst and through the rings 30,31, again, without any dead spots or stagnant areas, minimizing the residence time of the fluid between the filter elements 12. The outer surfaces of the upper pads 30a,31a define an upper surface 30d,31d for each ring 30,31 which contacts the upper filter element 12, while the outer surfaces of the lower pads 30b,31b define a lower surface 30e,31e for each ring 30,31 which contacts the lower filter element 12. Because the filter elements 12 in the illustrated embodiment are generally flat, the upper surfaces 30d,31d as well as the lower surfaces 30e,31e of the rings, 30,31 are generally coplanar. For more irregularly shaped filter elements, the upper surfaces, as well as the lower surfaces, of the inner and outer rings may be curved or may lie in different planes.

Figure 3:
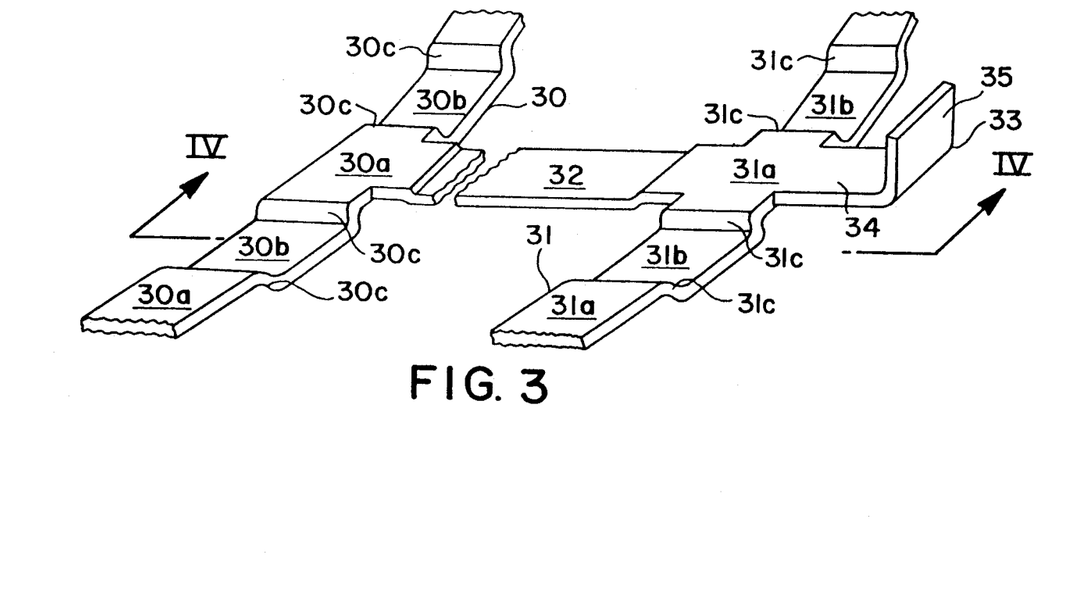
FIG. 3 is a perspective view of a portion of the spacer of FIG. 2.
Figure 4:
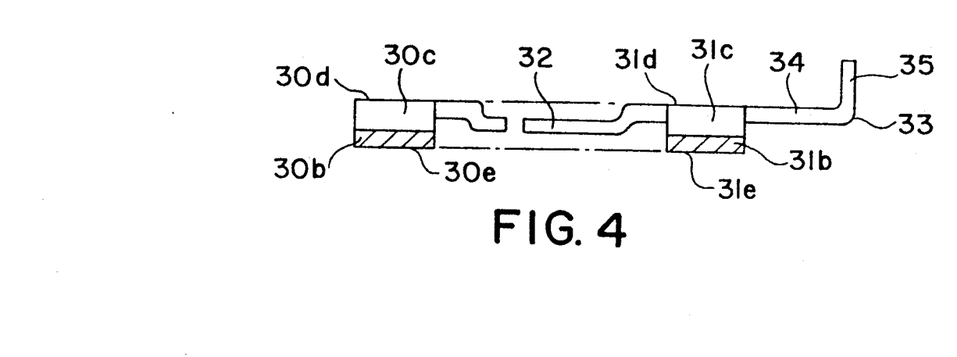
FIG. 4 is cross-sectional view of the portion of the spacer shown in FIG. 3 as viewed along line IV—IV.

The rings 30,31 are rigidly connected to one another by struts 32 which extend between the rings 30,31, as shown in FIG. 3. Although the struts may be configured in a variety of ways, they are preferably arranged to provide ample open space between the rings. For example, in the illustrated embodiment, the upper 30d,31d and lower 30e,31e surfaces of the adjacent rings 30,31 define an envelope and the struts 32 preferably extend radially between the rings 30,31 spaced from the outer boundaries of the envelope, as shown in FIG. 4. Consequently, when the spacer 22 is sandwiched between adjacent filter elements 12, there are openings between the struts 32 and the upper and lower filter elements 12. These openings further minimize any blinding of the porous filter 20 as well as the resistance to fluid flow and the residence time of the fluid between the filter elements 12.

The positioning arrangement 24 of the spacer 22 serves to maintain the corrugated body 23 in position between adjacent filter elements 12 and it may be variously configured. For example, the positioning arrangement may be arranged to face the outer periphery of one or both of the adjacent filter elements so that the outer periphery of each filter element serves as a stop. The portion of the positioning arrangement which faces the filter elements may be spaced from the outer periphery of the filter element, allowing some lateral motion of the corrugated body 23 between the filter elements 12. However, in preferred embodiments, the positioning arrangement 24 engages the outer periphery of the filter element, preventing any lateral motion of the corrugated body 23.

A positioning arrangement which faces the outer periphery of the filter elements may be constructed in a variety of ways including, for example, as a generally annular lip which extends beyond and faces one or both of the adjacent filter elements 12. In the embodiment illustrated in FIGS. 1-4, the positioning arrangement 24 comprises a plurality of circumferentially spaced fingers 33 which extend outwardly from the outermost ring 31 slightly beyond the filter elements 12 and face only one of the adjacent filter elements 12. Although the fingers 33 are shown as radial extensions of the struts 32, they may extend from the outer ring 31 circumferentially offset from the struts 32. Each of the fingers 33 includes a radial projection 34 which extends outwardly from a pad, e.g., an upper pad 31a, and an axially extending flange 35 which faces the filter element 12. The spacer need not be positively attached to the filter element but may be maintained in place simply by the flanges 35 and by the compressive forces between adjacent filter elements 12. This allows the spacer to be easily removed, cleaned, and reassembled in the filter assembly. For example, in the embodiment of FIGS. 1-4, the fingers 33 are dimensioned so all of the flanges 35 engage and fit snugly against the outer periphery of the filter element 12. The flanges 35 may be hooked over the outer periphery of the filter element or they may extend axially far enough that the filter element 12 is unable to move up and over any of the flanges 35.

Figure 5:
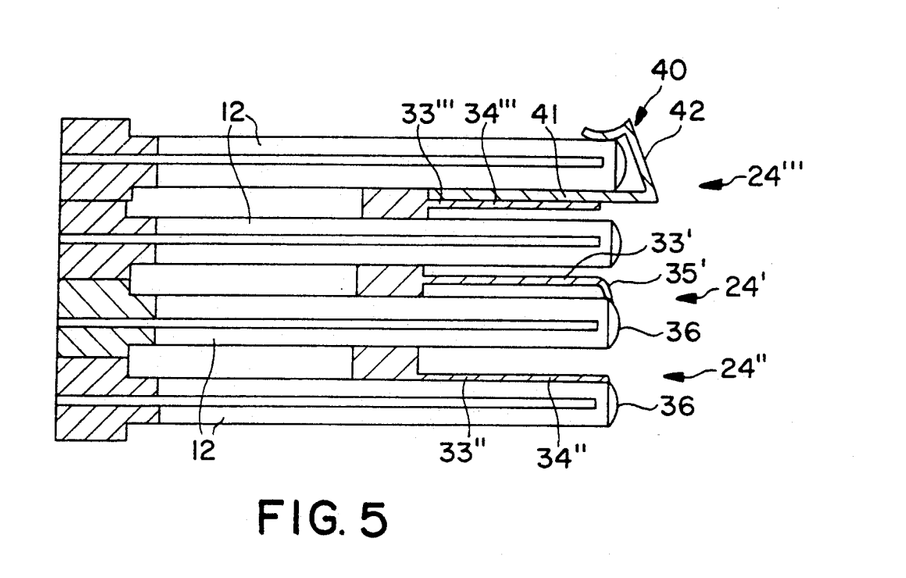
FIG. 5 is an elevation view of a portion of a stack of filter elements showing alternative positioning arrangements.

Alternatively, the spacer may be positively attached to the filter elements, for example, by welding the spacer to the outer periphery of the filter elements. As shown in FIG. 5, a second positioning arrangement 24' may comprise a plurality of circumferentially spaced fingers 33' similar to those of the first positioning arrangement 24 shown in FIGS. 1-4. However, the flanges 35' of the second positioning arrangement 24' may be shorter than those of the first positioning arrangement 24. The flanges 35' of the second positioning arrangement 24' need only be long enough to extend into a weld 36 at the outer periphery of the filter element 12, positively attaching the spacer to the filter element.

A third positioning arrangement 24", also shown in FIG. 5, is similar to the second positioning arrangement 24', but the fingers 33" do not include a flange. Instead, the radial projections 34" extend along the surface of the filter element 12 and into a weld 36 at the outer periphery of the filter element 12, positively attaching the spacer to the filter element.

The spacer may also be positively attached to the filter element by a fourth positioning arrangement 24''' which includes one or more spring clips 40, as further shown in FIG. 5. The fourth positioning arrangement 24''' includes a plurality of circumferentially spaced fingers 33''' some including a radial projection 34''' and a spring clip 40 at the end of the radial projection 34'''. Any number of fingers may include spring clips, but a preferred embodiment has only three spring clips 40 spaced about 120° apart. The spring clip 40 may be unitarily formed with the radial projection. However, in the preferred embodiment, the spring clip 40 is a separate component and has an elongated tang 41 which is fixed to the end of the radial projection 34''' e.g., by a weld. The spring clip 40 further has a clip portion 42 which is arranged to face and clip onto the outer periphery of a filter element. All of the clip portions 42 may extend axially in the same direction allowing the spacer to be clipped to a single filter element 12. Alternatively, some of the clip portions 42 may extend axially in opposite directions, allowing the spacer to be clipped to both adjacent filter elements 12.

Positively attaching the spacer to a filter element 12 by a spring clip 40 has several advantages. The spring clips 40 ensure that the spacers are maintained in position as the fluid flows through the filter assembly. Yet, the spring clips 40 are easily detached from the filter elements, greatly facilitating disassembly, cleaning, and reassembly.

The spacer may be formed from any material which has sufficient structural integrity to support the filter elements, which is compatible with the fluid being filtered, and which can withstand the process conditions encountered. For example, for low temperature applications the spacer may be formed from a polymeric material, such as plastic, which has been injection molded. For high temperature applications, the spacer may be formed from a metal, such as stainless steel, which has been stamped from sheet steel and then corrugated in a die. Preferred metals include stainless steel and Inconel, a metal alloy. Where the spacer includes a spring clip, the entire spacer or, preferably, only the spring clip may be fashioned from a spring steel.

Figure 6:
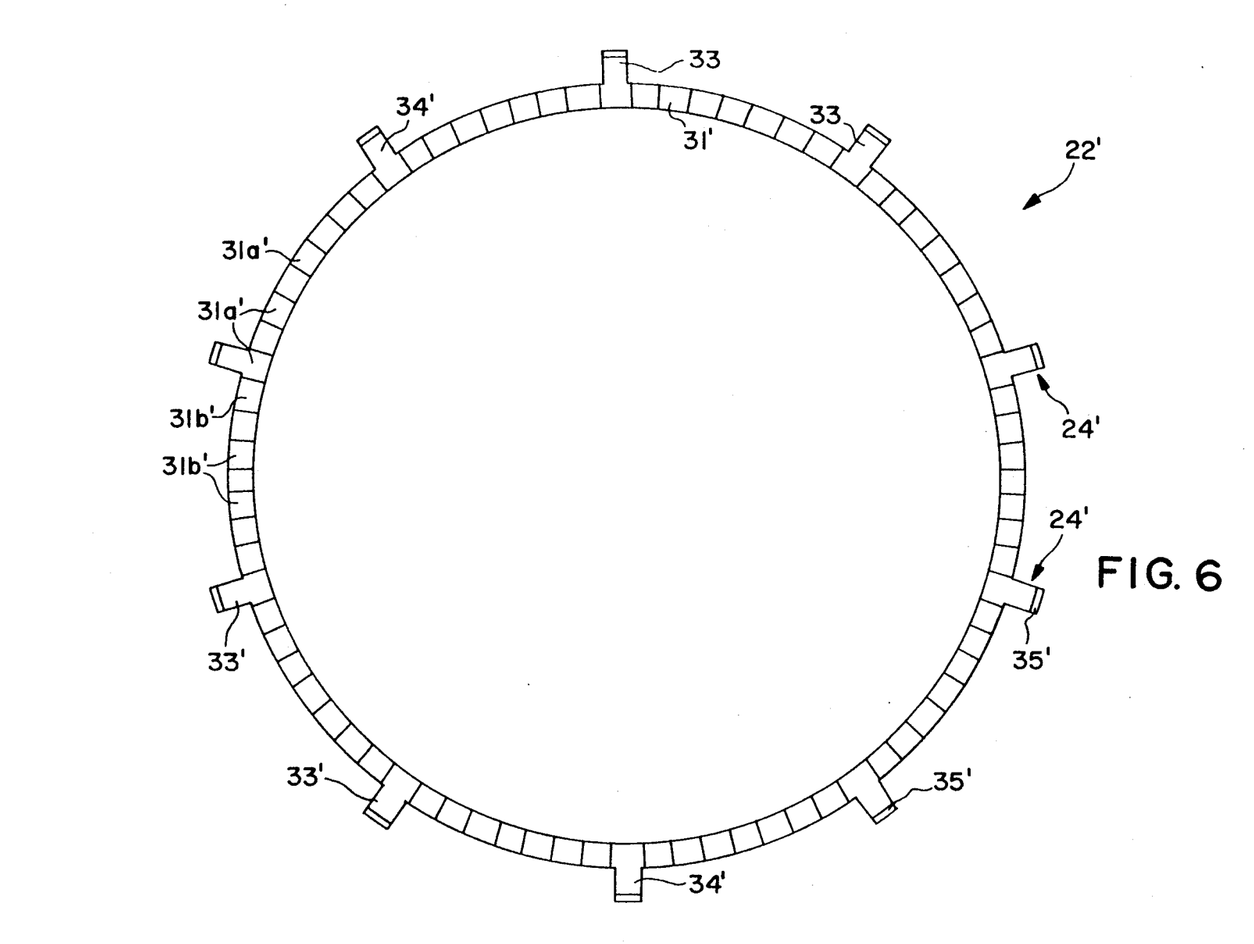
FIG. 6 is a top plan view of a second spacer embodying the present invention.

As shown in FIG. 6, a second spacer 22' embodying the invention comprises only one ring 31' but is otherwise very similar to the spacer 22 shown in FIG. 2. (Corresponding components of the two embodiments are labeled with identical reference numerals.) For example, any of the positioning arrangements previously described may be included in the second spacer 22'.

Where the diameter of the filter element is small, a single ring 31' can be sufficient to support the filter element 12. The single ring 31' preferably has an outer diameter less than the diameter of the filter element 12 but large enough to provide support along the outer edge of the filter element 12. Further, limiting the number of rings to one significantly reduces the impediments to fluid flow between the adjacent filter elements 12 and also minimizes blinding of the filter elements 12.

Figure 7:
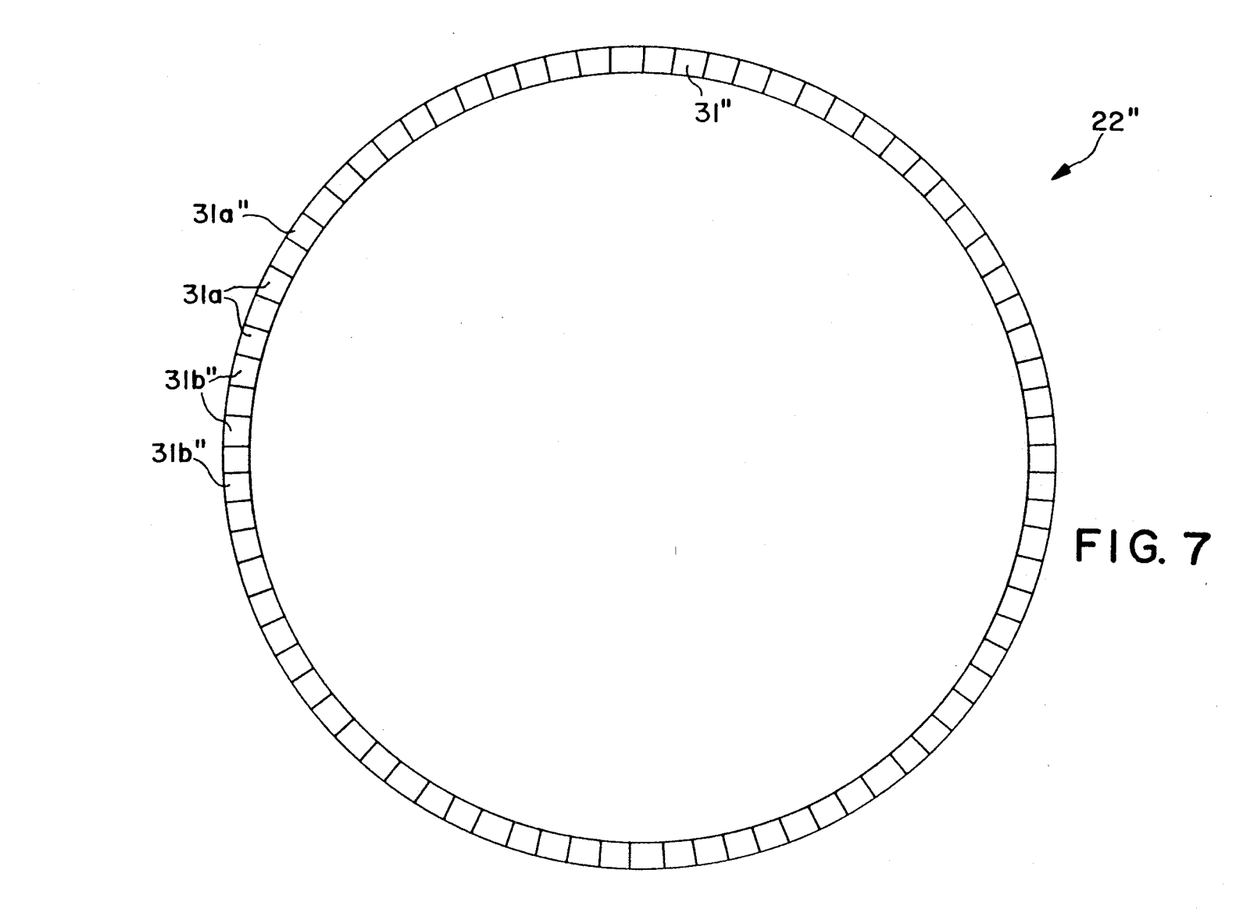
FIG. 7 is a top plan view of a third spacer embodying the present invention.

As shown in FIG. 7, a third spacer 22" embodying the present invention includes only a corrugated body 23, such as a single ring 31', which may be similar to the ring 31' of the second spacer 22'. In particular, the third spacer 22" has no positioning arrangement. In some applications, e.g., where the filter assembly will experience little mechanical vibration or where the compressive forces between adjacent filter elements are large, the third spacer 22" may be reliably maintained in position without a positioning arrangement. This further reduces the impediments to fluid flow between adjacent filter elements 12 and minimizes blinding of the filter elements 12.

Similar to the first spacer 22, the inner diameter of the ring 31',31" of each the second and third spacers 22',22" may be larger than the inner diameter of a filter element 12 and no smaller than about one-third of the outer diameter of the filter element. Further, the inner diameter of each ring 31',31" is preferably at least about 10% larger than the diameter of the hub 15. Therefore, the second and third spacers 22',22" define openings 25',25" which provide significant space between the hub 15 and the spacer 22". Further, the second and third spacers 22',22" are free of any structure which extends into the openings 25',25". Therefore, there is no impediment to fluid flow in the vicinity of the hub and fluid freely flows within the deepest recesses between the adjacent filter elements without any dead spots or stagnant areas.

Although the present invention has been described in terms of several embodiments, it is not limited to those embodiments. Alternative embodiments and modifications, which would still be encompassed by the invention, may be made by those skilled in the art, particularly in light of the foregoing teachings. Therefore, the following claims are intended to cover any alternative embodiments, modifications, or equivalents which may be included within the spirit and scope of the invention as defined by the claims.

We claim:

1. A filter assembly comprising at least one filter element having an exterior and a spacer positioned adjacent to the exterior of the filter element, the spacer including a body having an opening which is larger than an inner diameter of the filter element and is no smaller than about one-third of the outer diameter of the filter element, the spacer being free of any structure which extends into the opening.

2. The filter assembly of claim 1 wherein the body is corrugated.

3. The filter assembly of claim 1 wherein the body consists of a single ring and the body is free of any structure which extends outwardly from the ring.

4. The filter assembly of claim 1 wherein the body includes at least one ring.

5. The filter assembly of claim 1 wherein the body includes a plurality of nested rings connected to one another.

6. The filter assembly of claim 5 wherein the body includes no more than two rings.

7. The filter assembly of claim 5 wherein the diameter of the innermost ring defines the opening.

8. The filter assembly of claim 5 wherein the diameter of the outermost ring is only slightly less than the diameter of the filter element.

9. The filter assembly of claim 5 wherein each of the rings has a first surface and the first surfaces are coplanar.

10. The filter assembly of claim 9 wherein each of the rings has a second surface opposite to the first surface and the second surfaces are coplanar.

11. The filter assembly of claim 5 wherein the body further comprises one or more struts which extend between and connect the rings.

12. The filter assembly according to claim 11 wherein the struts extend radially between the rings.

13. The filter assembly of claim 11 wherein each ring has first and second opposing surfaces, the first and second surfaces of adjacent rings defining an envelope, and wherein the struts extend between the adjacent rings within the envelope and are spaced from the outer boundaries of the envelope.

14. The filter assembly of claim 1 further comprising a positioning arrangement which extends outwardly from the body to the outer periphery of the filter element.

15. The filter assembly of claim 14 wherein the positioning arrangement includes a plurality of fingers.

16. The filter assembly of claim 15 wherein at least one finger includes a projection extending radially outwardly from the ring and a flange extending axially from the projection.

17. The filter assembly of claim 16 wherein the flange is arranged to face the outer periphery of the filter element.

18. The filter assembly of claim 15 wherein at least one finger includes a spring clip.

19. The filter assembly of claim 15 wherein each finger consists of a radial projection.

20. The filter assembly of claim 1 wherein the body includes a single corrugated ring, the inner diameter of the ring defining the opening, and wherein the filter assembly further comprises a positioning arrangement including a plurality of fingers which extend outwardly from the ring toward the outer periphery of the filter element.

21. The filter assembly of claim 20 wherein at least one of the fingers includes a spring clip.

22. The filter assembly of claim 20 wherein at least one of the fingers is welded to the filter element at or near the periphery of the filter element.

23. The filter assembly of claim 1 wherein the body includes a plurality of nested, corrugated rings and one or more struts which extend between and connect the rings, the diameter of the innermost ring defining the opening, and wherein the filter assembly further comprises a positioning arrangement including a plurality of fingers which extend outwardly from the outermost ring toward the outer periphery of the filter element.

24. The filter assembly of claim 23 wherein at least one of the fingers includes a spring clip.

25. The filter assembly of claim 23 wherein at least one of the fingers is welded to filter element at or near the periphery of the filter element.

26. A filter assembly comprising first and second filters elements, each having an exterior, and a spacer positioned between the exteriors of the first and second filter elements, the spacer including a body having an opening which is larger than an inner diameter of the first filter element and is no smaller than about one-third of the outer diameter of the first filter element, the spacer being free of any structure which extends into the opening.

27. A filter assembly comprising at least one filter element having an exterior and a spacer positioned adjacent to the exterior of the filter element, the spacer including a body and a positioning arrangement which extends outwardly from the body to the outer periphery of the filter element.

28. A filter assembly comprising:
a housing having an inlet and an outlet;
at least first and second, generally disc-shaped, filter elements stacked inside the housing, each filter element having an exterior which communicates with the inlet and the stack of filter elements having a central channel which communicates with the outlet; and
a spacer positioned between the exteriors of the filter elements and including a body having an opening, the size of the opening being greater than the inner diameter and no less than about one-third of the outer diameter of the first filter element and the spacer being free of any structure which extends into the opening.

29. The filter assembly of claim 28 wherein the body is corrugated.

30. The filter assembly of claim 28 wherein the body comprises at least one ring and the opening comprises a circular hole defined by the inner diameter of the ring.

31. The filter assembly of claim 28 wherein the body comprises a plurality of nested rings connected to one another and the opening comprises a circular hole defined by the inner diameter of the innermost ring.

32. The filter assembly of claim 31 wherein each ring includes first and second surfaces which contact the first and second filter elements, respectively, and wherein the body further includes struts which extend between the rings and are spaced from both the first and second filter elements.

33. The filter assembly of claim 28 wherein the spacer further includes a positioning arrangement comprising a plurality of fingers which extend outwardly from the body.

34. The filter assembly of claim 33 wherein at least one finger is positively attached to at least one of the filter elements.

35. The filter assembly of claim 34 wherein at least one finger includes a spring clip which is detachably mountable to said one filter element.

36. The filter assembly of claim 34 wherein said one finger is welded to the outer periphery of said one filter element.

37. The filter assembly of claim 28 wherein at least one finger includes a flange which extends axially and is arranged to face at least one of the filter elements.

* * * * *